US010540605B2

(12) United States Patent
Mermoud et al.

(10) Patent No.: US 10,540,605 B2
(45) Date of Patent: Jan. 21, 2020

(54) TRAFFIC-BASED INFERENCE OF INFLUENCE DOMAINS IN A NETWORK BY USING LEARNING MACHINES

(71) Applicant: Cisco Technology, Inc., San Jose, CA (US)

(72) Inventors: Grégory Mermoud, Veyras (CH); Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 13/946,386

(22) Filed: Jul. 19, 2013

(65) Prior Publication Data
US 2014/0222748 A1    Aug. 7, 2014

Related U.S. Application Data

(60) Provisional application No. 61/761,120, filed on Feb. 5, 2013.

(51) Int. Cl.
*G06N 20/00* (2019.01)
(52) U.S. Cl.
CPC .................. *G06N 20/00* (2019.01)
(58) Field of Classification Search
CPC ..................... G06N 99/005; H04L 41/142
See application file for complete search history.

(56) References Cited

U.S. PATENT DOCUMENTS

| 8,611,346 | B1 | 12/2013 | Wijnands et al. |
| 2006/0077907 | A1 | 4/2006 | Rabinovitch et al. |
| 2008/0117879 | A1* | 5/2008 | Wu ........................ H04W 36/36 370/332 |
| 2008/0247327 | A1* | 10/2008 | Weil ........................ H04L 43/50 370/252 |
| 2010/0110891 | A1 | 5/2010 | Shah et al. |
| 2012/0020216 | A1* | 1/2012 | Vashist ................... H04L 41/14 370/235 |

(Continued)

OTHER PUBLICATIONS

Gunnar, Anders, Mikael Johansson, and Thomas Telkamp. "Traffic matrix estimation on a large IP backbone: a comparison on real data." Proceedings of the 4th ACM SIGCOMM conference on Internet measurement. ACM, 2004.*

(Continued)

*Primary Examiner* — Scott A. Waldron
*Assistant Examiner* — Kevin W Figueroa
(74) *Attorney, Agent, or Firm* — Behmke Innovation Group LLC; James Behmke; Stephen D. LeBarron

(57) ABSTRACT

In one embodiment, techniques are shown and described relating to traffic-based inference of influence domains in a network by using learning machines. In particular, in one embodiment, a management device computes a time-based traffic matrix indicating traffic between pairs of transmitter and receiver nodes in a computer network, and also determines a time-based quality parameter for a particular node in the computer network. By correlating the time-based traffic matrix and time-based quality parameter for the particular node, the device may then determine an influence of particular traffic of the traffic matrix on the particular node.

18 Claims, 11 Drawing Sheets

(56) References Cited

U.S. PATENT DOCUMENTS

| | | | |
|---|---|---|---|
| 2013/0086267 A1* | 4/2013 | Gelenbe | H04L 12/5695 709/225 |
| 2013/0250811 A1 | 9/2013 | Vasseur et al. | |
| 2013/0258852 A1 | 10/2013 | Valluri et al. | |
| 2013/0311673 A1* | 11/2013 | Karthikeyan | H04L 41/147 709/239 |
| 2013/0336126 A1 | 12/2013 | Vasseur et al. | |
| 2014/0071802 A1* | 3/2014 | Klimin | H04L 47/36 370/216 |

OTHER PUBLICATIONS

Lu, Kejie, et al. "Robust and efficient detection of DDoS attacks for large-scale internet." Computer Networks 51.18 (2007): 5036-5056. APA.*

Jardosh, et al., "Understanding Link-Layer Behavior in Highly Congested IEEE 802.11b Wireless Networks", SIGCOMM'05 Workshops, Aug. 2005, pp. 11-16, ACM, Philadelphia, PA.

Kühl, et al., "Notification of Transmittal of the International Search Report and the Written Opinion of the International Searching Authority, or the Declaration", Patent Cooperation Treaty, PCT/US2014/014700, dated Apr. 28, 2014, 12 pages, European Patent Office, Rijswijk, Netherlands.

Ting, et al., "Variational Bayesian Least Squares: An Application to Brain-Machine Interface Data", Neural Networks, vol. 21, No. 8, Oct. 2008, pp. 1112-1131, Elsevier Science Publishers, Barking, Great Britain.

Zhang, et al., "Fast Accurate Computation of Large-Scale IP Traffic Matrices from Link Loads", SIGMETRICS'03, Jun. 2003, pp. 206-217, ACM, San Diego, CA.

Mermoud, et al., "Traffic-Based Inference of Influence Domains in a Network by Using Learning Machines", U.S. Appl. No. 61/761,120, filed Feb. 5, 2013, 29 ppages, U.S. Patent and Trademark Office.

Ting, et al., "Efficient Learning and Feature Selection in High-Dimensional Regression", Neural Computation, 22(4), 831-886, Massachusetts Institute of Technology.

Vasseur, et al., "Remote Probing for Remote Quality of Service Monitoring", U.S. Appl. No. 61/761,106, filed Feb. 5, 2013, 26 pages, U.S. Patent and Trademark Office.

Vasseur, et al., "Learning Machine Based Detection of Abnormal Network Performance", U.S. Appl. No. 61/761,117, filed Feb. 5, 2013, 39 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY
DISTRIBUTION OVER THREE RANDOM VARIABLES; X, Y, AND Z

BN FOR LINEAR REGRESSION

TRAFFIC MATRIX "T" (AT TIME "X")
600

| NODE | ROOT | 11 | 12 | 13 | 21 | 22 | 23 | 24 | 31 | 32 | 33 | 34 |
|------|------|----|----|----|----|----|----|----|----|----|----|----|
| ROOT | 3 | 15 | 12 | 10 | 0 | 0 | 0 | 0 | 0 | 0 | 0 | 0 |
| 11 | 39 | 1 | 3 | 0 | 8 | 2 | 0 | 0 | 0 | 0 | 0 | 0 |
| 12 | 34 | 2 | 1 | 0 | 0 | 6 | 5 | 0 | 0 | 0 | 0 | 0 |
| 13 | 28 | 0 | 0 | 1 | 0 | 0 | 1 | 7 | 0 | 0 | 0 | 0 |
| 21 | 0 | 29 | 0 | 0 | 1 | 0 | 1 | 0 | 5 | 5 | 0 | 0 |
| 22 | 0 | 1 | 17 | 0 | 0 | 1 | 1 | 0 | 0 | 1 | 4 | 0 |
| 23 | 0 | 0 | 8 | 2 | 0 | 2 | 0 | 0 | 0 | 0 | 3 | 0 |
| 24 | 0 | 0 | 0 | 20 | 0 | 0 | 0 | 1 | 0 | 0 | 0 | 4 |
| 31 | 0 | 0 | 0 | 0 | 9 | 3 | 0 | 0 | 1 | 2 | 0 | 0 |
| 32 | 0 | 0 | 0 | 0 | 11 | 9 | 1 | 0 | 1 | 1 | 2 | 0 |
| 33 | 0 | 0 | 0 | 0 | 0 | 0 | 0 | 0 | 0 | 3 | 1 | 1 |
| 34 | 0 | 0 | 0 | 0 | 0 | 0 | 0 | 10 | 0 | 0 | 1 | 1 |

TRANSMITTERS / RECEIVERS

FIG. 6

TRAFFIC MATRIX "T" (AT TIME "X")
(REDUCED FOR CORRELATION WITH NODE 34)
800

| NODE | ROOT | 11 | 12 | 13 | (21) | (22) | 23 | 24 | (31) | 32 | 33 | 34 |
|---|---|---|---|---|---|---|---|---|---|---|---|---|
| ROOT | 3 | 15 | 12 | 10 | - | - | 0 | 0 | - | 0 | 0 | 0 |
| 11 | 39 | 1 | 3 | 0 | - | - | 0 | 0 | - | 0 | 0 | 0 |
| 12 | 34 | 2 | 1 | 0 | - | - | 5 | 0 | - | 0 | 0 | 0 |
| 13 | 28 | 0 | 0 | 1 | - | - | 1 | 7 | - | 0 | 0 | 0 |
| (21) | - | - | - | - | - | - | - | - | - | - | - | - |
| (22) | - | - | - | - | - | - | - | - | - | - | - | - |
| 23 | 0 | 0 | 8 | 2 | - | - | 1 | 0 | - | 0 | 3 | 0 |
| 24 | 0 | 0 | 0 | 20 | - | - | 0 | 1 | - | 0 | 0 | 4 |
| (31) | - | - | - | - | - | - | - | - | - | - | - | - |
| 32 | 0 | 0 | 0 | 0 | - | - | 0 | 0 | - | 1 | 2 | 0 |
| 33 | 0 | 0 | 0 | 0 | - | - | 1 | 0 | - | 3 | 1 | 1 |
| (34) | - | - | - | - | - | - | - | - | - | - | - | - |

TRANSMITTERS / RECEIVERS

FIG. 8

TRAFFIC-BASED INFERENCE OF INFLUENCE DOMAINS IN A NETWORK BY USING LEARNING MACHINES

RELATED APPLICATION

The present invention claims priority to U.S. Provisional Application Ser. No. 61/761,120, filed Feb. 5, 2013, entitled "TRAFFIC-BASED INFERENCE OF INFLUENCE DOMAINS IN A NETWORK BY USING LEARNING MACHINES", by Mermoud, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example traffic matrix;
FIG. 8 illustrates an example reduced traffic matrix.

DESCRIPTION OF EXAMPLE EMBODIMENTS

Overview

Figure 1:
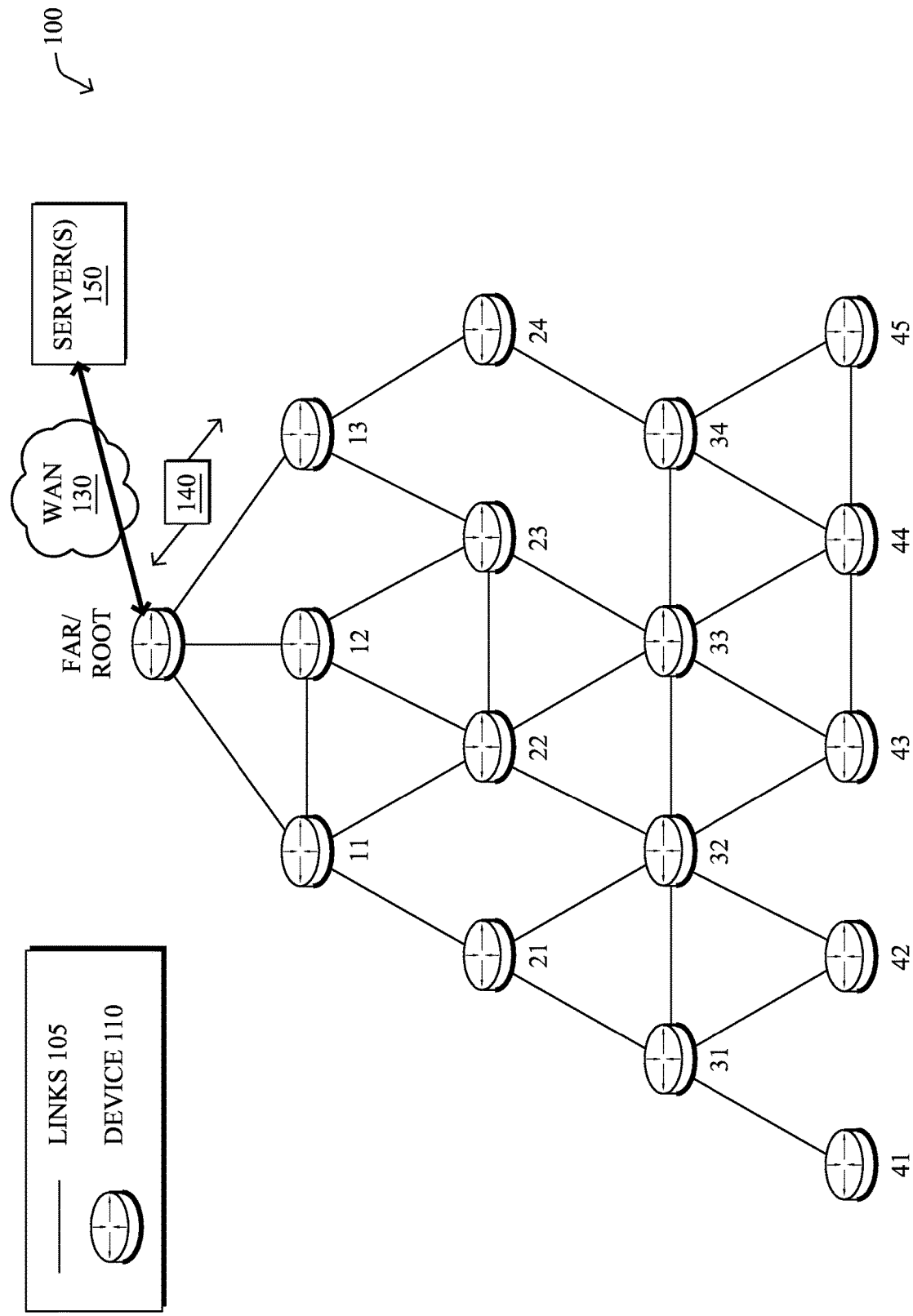
FIG. 1 illustrates an example communication network.

According to one or more embodiments of the disclosure, techniques are shown and described relating to traffic-based inference of influence domains in a network by using learning machines. In particular, in one embodiment, a management device computes a time-based traffic matrix indicating traffic between pairs of transmitter and receiver nodes in a computer network, and also determines a time-based quality parameter for a particular node in the computer network. By correlating the time-based traffic matrix and time-based quality parameter for the particular node, the device may then determine an influence of particular traffic of the traffic matrix on the particular node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus.

WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
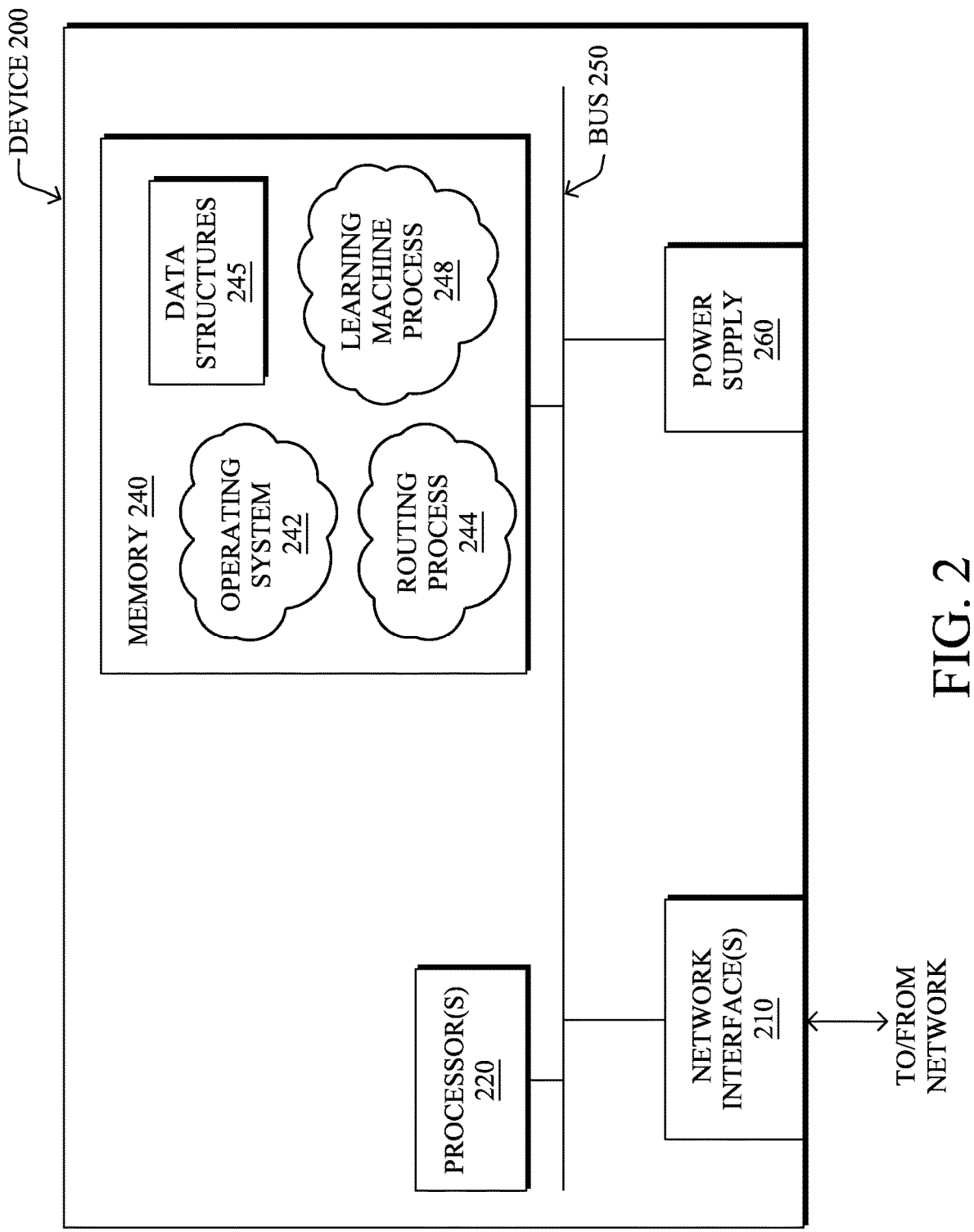
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
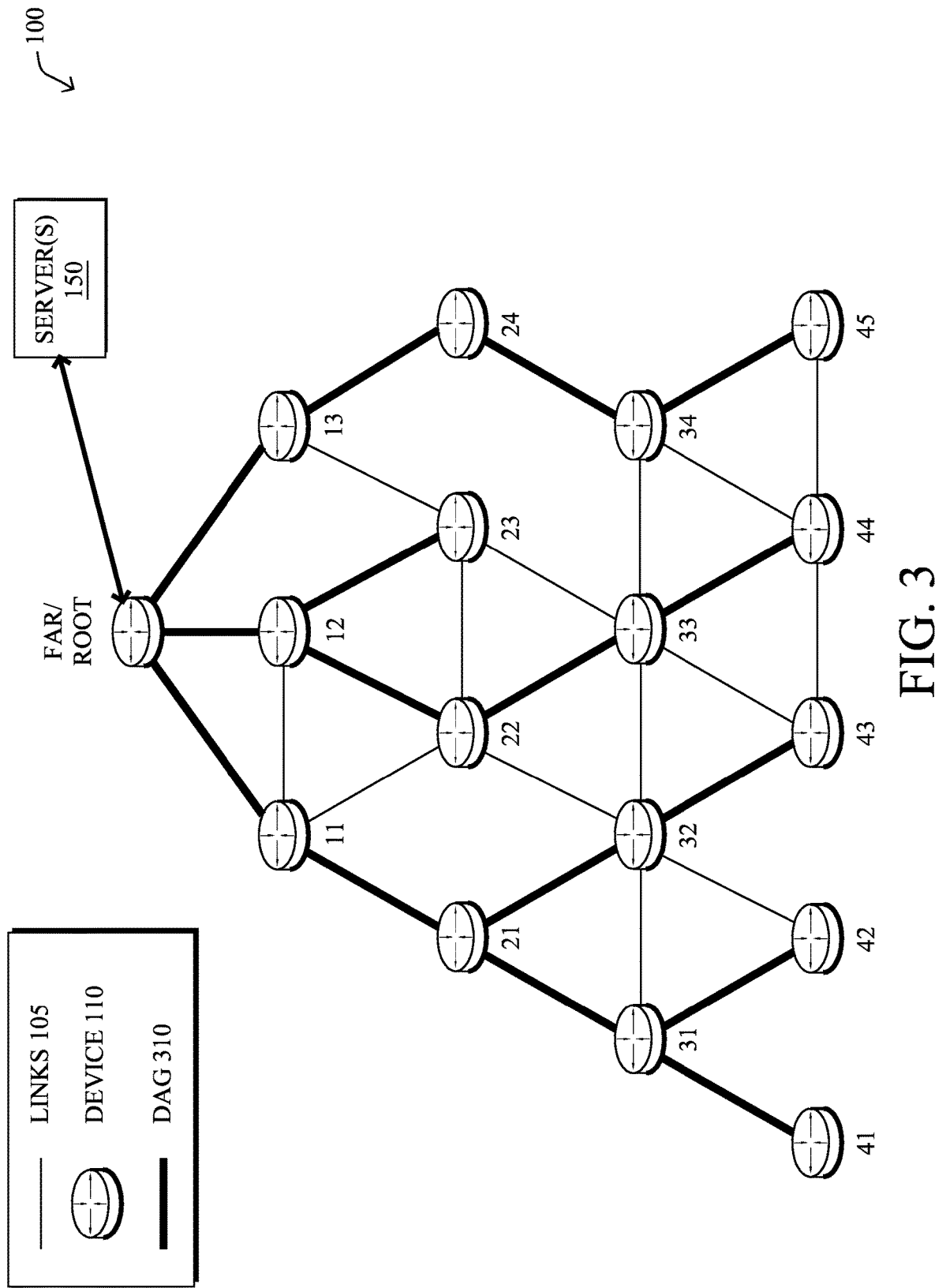
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad \text{(Eq. 1)}$$

Figure 4:
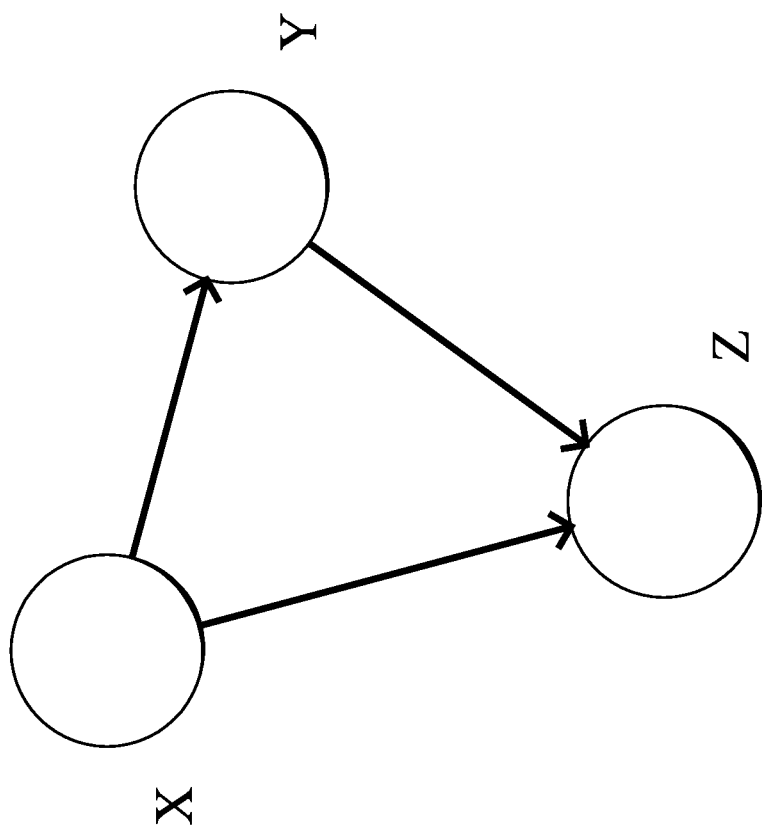
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\varepsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\varepsilon$ is a Gaussian random variable used to model the uncertainty and/or the noise on the estimate M. The linear regression consists in finding the weight vector b that fulfills the maximum likelihood criterion (which coincides with the least square criterion when $\varepsilon$ is Gaussian). In particular, the optimal b must minimize the Mean Squared Error (MSE):

$$MSE=\Sigma_i(b^T x_i-y_i)^2/N \quad \text{(Eq. 3)}$$

where N is the total number of input data points, i.e., i= 1, ..., N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\varepsilon$ is not Gaussian.

Figure 5:
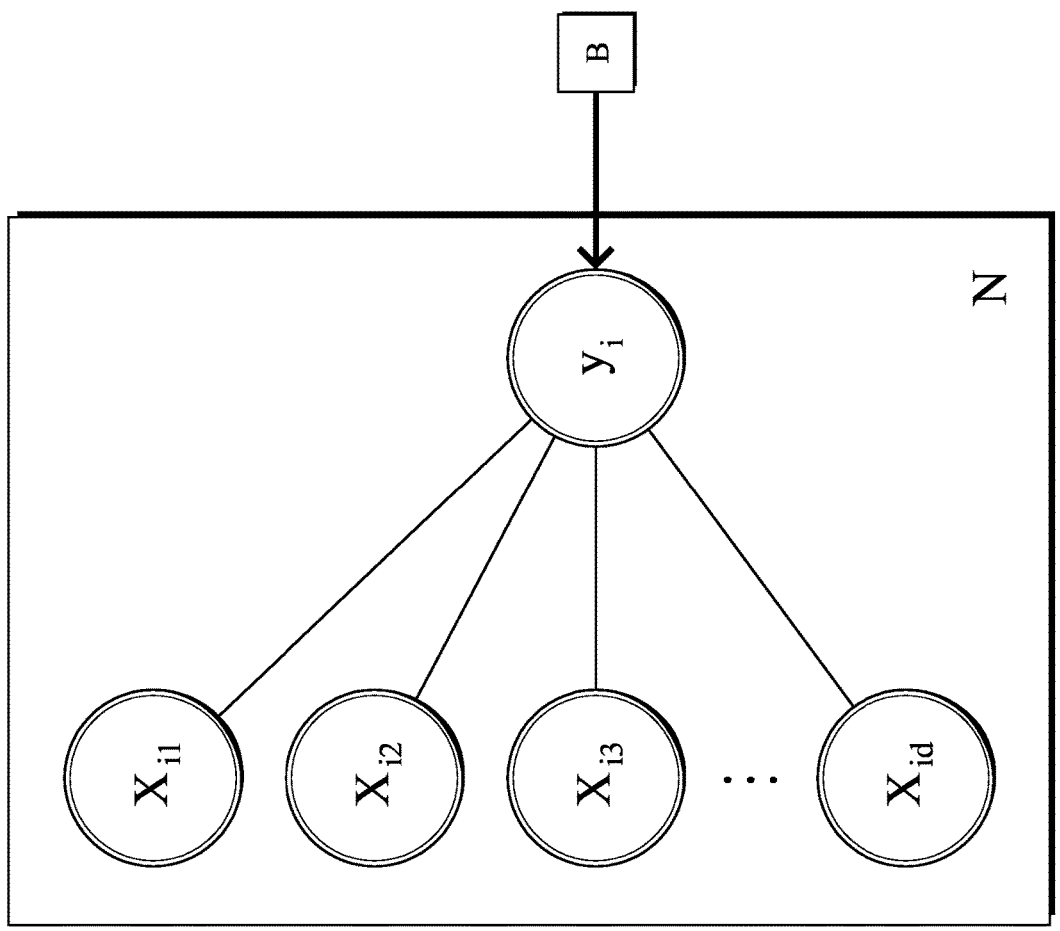
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Another critical issue when estimating the mapping between $x_i$ and $M_i$ is that their relationship may be non-linear. Even in this case, one may use tools from linear regression such as VBLS: instead of performing the mapping between the raw data x and $M_i$, one may increase the dimensionality of the input space by extending it with non-linear transformations of the input data. These transformations may be called features, and are noted $f_j(x)$. These features $f_j(x)$ may be non-linear functions of one or more dimensions of x. Below are a few examples:

$$f_i(x)=x_i$$

$$f_{d+1}(x)=x_1 x_2$$

$$f_{d+2}(x)=\exp(x_1)$$

$$f_{d+3}(x)=x_1^3$$

$$f_{d+4}(x)=\log(x_1)$$

In this context, one may rewrite the linear regression as follows:

$$M_i = F(x_i) = \sum_j b_j f_j(x_i) + \varepsilon \text{ for } j=1,2,\ldots \quad \text{(Eq. 4)}$$

However, this approach poses one key challenge: there is an infinite number of possible features $f_j(x)$. As a result, even though VBLS has the ability to perform feature selection in an efficient way, the problem of exploring this infinitely large set of features is yet to be solved. Also, when considering only simply combinations of input dimension such as $f_1(x)=x_1 \cdot x_2$, $f_2(x)=x_1^2 \cdot x_2$, or $f_3(x)=x_1 \cdot x_2^2$, there is no guarantee that one can construct an accurate mapping $F(x_i)$, because there may be a need to incorporate non-integer powers of x (square roots, etc.) or more complex functions such as $\exp(\cdot)$, $\log(\cdot)$, or even trigonometric functions (e.g., $\sin(\cdot)$, $\cos(\cdot)$ etc.). This 'catalogue' of feature 'type' needs to be explored in a more or less intelligent way such that one can construct the most accurate mapping $F(x_i)$. Solutions to this problem range from a manual feature selection based on expert knowledge to automated exploration of the solution space using meta-heuristics.

The fact that many LLNs are composed of thousands of wireless (WiFi/15.4) and/or wired (e.g., PLC) nodes that communicate via a shared, unstructured medium makes them very difficult to analyze, optimize, and troubleshoot. In particular, it is generally not possible to determine how nodes are influencing each other, i.e., for a given node $n_k$, what is the set of other nodes whose traffic may impact its own performance. Determining these influences is very critical for many tasks such as debugging and troubleshooting, performance evaluation, QoS, and routing.

The techniques herein propose a Learning Machine (LM) based algorithm that can determine the set of nodes that affect the performance (referred to as QoS hereafter) of a particular node $n_k$. The fundamental idea behind the techniques is to find correlations between the traffic observed between any pair of nodes ($n_i$, $n_j$) and the QoS of node $n_k$, denoted $Q_k$. Note that $Q_k$ may be a scalar, a set of values characterizing the QoS (delay, number of times the packet was retransmitted, etc.). Based on this information, one can then compute a measure of how relevant a given node $n_i$ is to the QoS of $n_k$. An immediate consequence of this relevance is that whenever $n_k$ is transmitting, $n_i$ should remain inactive, and vice versa, but various other algorithms could be used as a result of such information made available by the techniques herein.

Said differently, the techniques herein propose to leverage traffic information for estimating the QoS of each node in the network, and, more importantly, the influence that these nodes have on each other in terms of QoS. In other words, the techniques infer from the traffic matrix the influence domains in the network. Note that these influence domains will include collision domains, but they may be much larger, as the approach may also account for the influence of children whose traffic need to be routed through a given parent $n_k$, thereby decreasing the QoS of other children, the parent itself, and the surrounding nodes of the parent. Particularly, the techniques herein use LMs to detect the inference between an observed traffic matrix and a node's QoS using an approach that does not require any a-priori knowledge, in contrast with existing approaches. More generally, the techniques herein allow for the discovery of influence relationships that are non-obvious and unknown a priori.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein compute the traffic matrix $T=(T_{ij})$ where $T_{ij}$ is the traffic from the node $n_i$ to $n_j$. Note that $T_{ij}$ is usually not symmetric, and that this aspect is important with regards to the influence that the traffic may have on another node $n_k$, which may be affected upon transmission from $n_i$, but not upon reception (a hidden node problem). FIG. 6 illustrates an example time-based traffic matrix 600, indexed by nodes $n_i$ and $n_j$ (e.g., nodes 11-34, an abbreviate subset for clarity). Illustratively, the traffic shown may be in terms of a number of transmissions, a length of time of transmissions, an amount of data (e.g., kbits during the time collected), a rate of data, etc., and the numbers shown are merely used as an example. Notably, where nodes $n_i$ and $n_j$ are the same, such as node 11 and node 11, the matrix may be left empty, or as shown, may contain a traffic value indicative of broadcast transmissions from the device (where there is no particular "receiver" for the traffic). The matrix/table 600 shown is merely one example format of a suitable data structure (e.g., data structure 245), and is not meant to be limiting to the scope of the embodiments herein. For example, as shown, traffic primarily utilizes the DAG links (see FIG. 3) shown as underlined numbers, though other traffic (e.g., routing protocol messages) may create other traffic between the devices as shown in the matrix 600 of FIG. 6 as non-underlined numbers.

In LLNs using RPL in non-storing mode, all traffic generally transits through the FAR, and it is therefore straightforward to construct the matrix T. That being said, even if the traffic does not systematically transit via the root (use of RPL storing mode or other routing protocols such as Load-NG) various techniques can be used to compute the traffic matrix that will also provide information related to point-to-point communication that do not transit through the FAR. The matrix T depends on time, and it is therefore indexed by discrete timestamps $T^{(t1)}, T^{(t2)}, T^{(t3)}, \ldots$, etc. (illustrated in FIG. 6 as "at time X").

Figure 7:
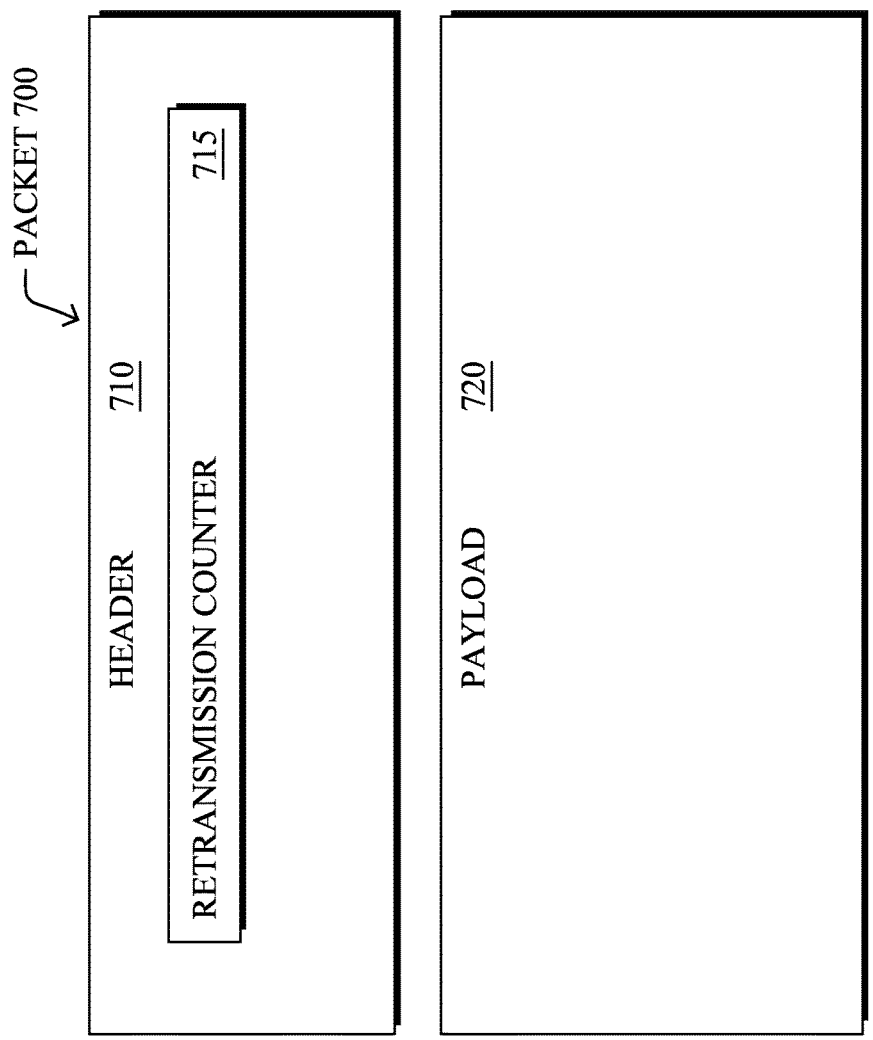
FIG. 7 illustrates an example packet format.

Many network performance criteria can be used to measure the QoS experienced by a node $n_k$. The path delay is certainly one of these QoS parameters and may be obtained thanks to probing or QoS remote monitoring, such as in U.S. Provisional Patent Application Ser. No. 61/761,106 entitled "Remote Probing for Remote Quality of Service Monitoring", filed by Vasseur et al. on Feb. 5, 2013. That being said, one of the key performance metrics that is not yet available from the network is the total number of times a packet has been retransmitted along a path P made of N nodes. Note that the MAC layer may or may not provide reliable messaging thanks to retransmissions. Even in presence of reliable MAC layer, there is currently no counter indicative of the number of retransmissions. Thus the techniques herein specify a new IPv6 "HbH" header TLV; according to RFC2460, the Option Type identifiers are internally encoded such that their highest-order two bits specify the action that must be taken if the processing IPv6 node does not recognize the Option Type, therefore the techniques herein set the two bits to 00 (skip over this option and continue processing the header). The third-highest-order bit of the Option Type specifies whether or not the Option Data of that option can change en-route to the packet's final destination. Thus, the techniques herein set the bit to 1. The TLV is used to encode the number of retries at each hop and is incremented along the path. Optionally, a second TLV is added to record the link ID where the K retransmits took place. The aim of this component is to specify protocol extension in order to measure a new QoS parameter: the number of retransmissions per packet along a specific path. FIG. 7 illustrates an example packet 700 (e.g., 140) having a standard header 710 and associated payload 720, with the optional retransmission counter field 715 within the header and optionally formatted as described above.

According to one or more embodiments herein, the techniques perform a linear regression between an high-dimensional input vector $x^{(t)}$ composed of the unrolled elements of the matrix $T^{(t)}$ (or a subset thereof, see below) and $Q_k^{(t)}$, the QoS of node k at time t. This component is an integral manner by which the influence domain on a node $n_i$ may be determined based on empirical traffic data: by contrast with existing systematic approaches/algorithms where one needs to select a priori a set of parameters/nodes that may influence the QoS experienced by a specific node, the techniques herein do not rely on any fixed a priori rule for deciding if a given node $n_j$ influences $n_i$; instead, the techniques herein estimate the statistical relevance of $n_j$'s traffic in estimating the QoS of $n_i$. The traffic T on a particular link is statistically relevant to $Q_i$, the QoS of $n_i$ if variations of T result in variations in $Q_i$. For instance, given a node $n_1$ and two nearby nodes $n_2$ and $n_3$, the techniques herein aim at measuring whether the traffic between $n_2$ and $n_3$ is influencing (positively or negatively) the QoS of $n_1$. Importantly, the techniques herein need not rely on any prior knowledge of the how this traffic link should influence $n_1$'s QoS; instead, this relationship is learned from historical data, that is, a sequence of traffic matrices $T^{(1)}$, $T^{(2)}$, . . . and corresponding QoS values $Q_1^{(1)}$, $Q_1^{(2)}$, etc. Additionally, the use of an LM-based algorithm such as VBLS is different from conventional techniques since the variables are not networking variables (link quality, etc.) but are rather traffic matrix datapoints used as input variables to determine their influence on the QoS on a per node basis.

As a result, the techniques herein may be used to discover influence relationships that are non-obvious and unknown a priori, which is a crucial property for LLNs. Notably, however, the techniques herein do not necessarily discover all influences, but this is acceptable given the nature of LLNs. Indeed, the traffic between a pair of nodes may itself be influenced by the traffic generated by the node for which the techniques are studying the QoS. For instance, for the sake of illustration, suppose that node A wants to send a traffic flow F to B and the objective is to determine whether or not F has an impact on the QoS experienced by C. If C generates some traffic F' interfering with F, the node A may make use of backoff (e.g., TCP) to reduce/shape its traffic thus reducing F in which case the traffic matrix would be conditioned by the interference. On the other hand, should F have a higher priority than F', the techniques herein would detect the inference.

Given the very high dimensionality (d) of the input vector (d is $O(N^2)$ with N number of nodes in the network, in the order of several thousands) and the presence of collinear dimensions (neighboring nodes may contribute to the QoS of node $n_k$ in roughly the same way), conventional approaches such as OLS are not suitable, and the use of techniques such as VBLS are required. VBLS presents the further advantages of automatically determining the relevant components of the input vector and being sufficiently computationally inexpensive for online, real time settings. The outcome of VBLS is a weight vector $b_k$ such that:

$$Q_k^{(t)} = b_k^T x^{(t)}$$

The vector $b_k$ answers two important questions: (1) $b_{k1}$ is a measure of the influence of a traffic link $\mathbf{l}=(n_i, n_j)$ on the QoS of node k; in particular, VBLS has the property of making irrelevant entries of $b_k$ converge to zero; (2) the vector $b_k$ allows one to predict the QoS of node k given the current traffic matrix $T^{(t)}$. This component is not merely VBLS itself, but merely illustratively utilize VBLS for computing influence domain in LLNs. Any other regression algorithm that offers similar relevance determination capabilities could be used in this context. Importantly, VBLS does not require any parameterization, thereby keeping the system simple to deploy and to use.

A third component of the techniques herein consists in a series of heuristics for diminishing the dimensionality of the input vector x. Indeed, even though VBLS is well suited for very high dimensionalities, typical LLNs may involve up to 5000 nodes, yielding a dimensionality in the order of 25 millions. Actually, T is expected to be pretty sparse in many illustrative scenarios, both because protocols such as RPL use a DAG/tree as routing structure, and because nodes have a limited range of communication. As a result, x can be node-dependent (and shall therefore be noted $x_i$) and it can include only those traffic links that are either (1) within communication range of the node $n_i$ or (2) belong to a routing path involving the node $n_i$. Note that in the case of a wired non broadcast domain LLNs, knowing the topology would drastically help reduce the space dimension. For example, back to our previous example, if F' and F are path disjoint, F is simply ignored when studying the QoS of the node C. With this simple heuristic, the dimensionality of x may be dramatically reduced, and within ranges that are suitable to online, real time, embedded settings. For instance, if $n_i$ is part of an LLN with 5000 nodes, the heuristic will bring the input vector $x_i$ from a dimensionality of 25 millions to a few hundreds or less. As a result, this component is critical to the efficiency of the techniques herein in practice in order to reduce the dimensionality of the input vector. FIG. 8 illustrates the example traffic matrix 600 of FIG. 6 having been reduced for correlation with node 34 (matrix 800); that is, leaving only nodes that are in communication range of node 34 and that are in communication range of any node that is on a path (e.g., the DAG) that involves node 34. (Note that node 34 itself as a transmitter may be removed from the set as well, under the assumption that its own transmissions do not affect themselves.)

Figure 9A:
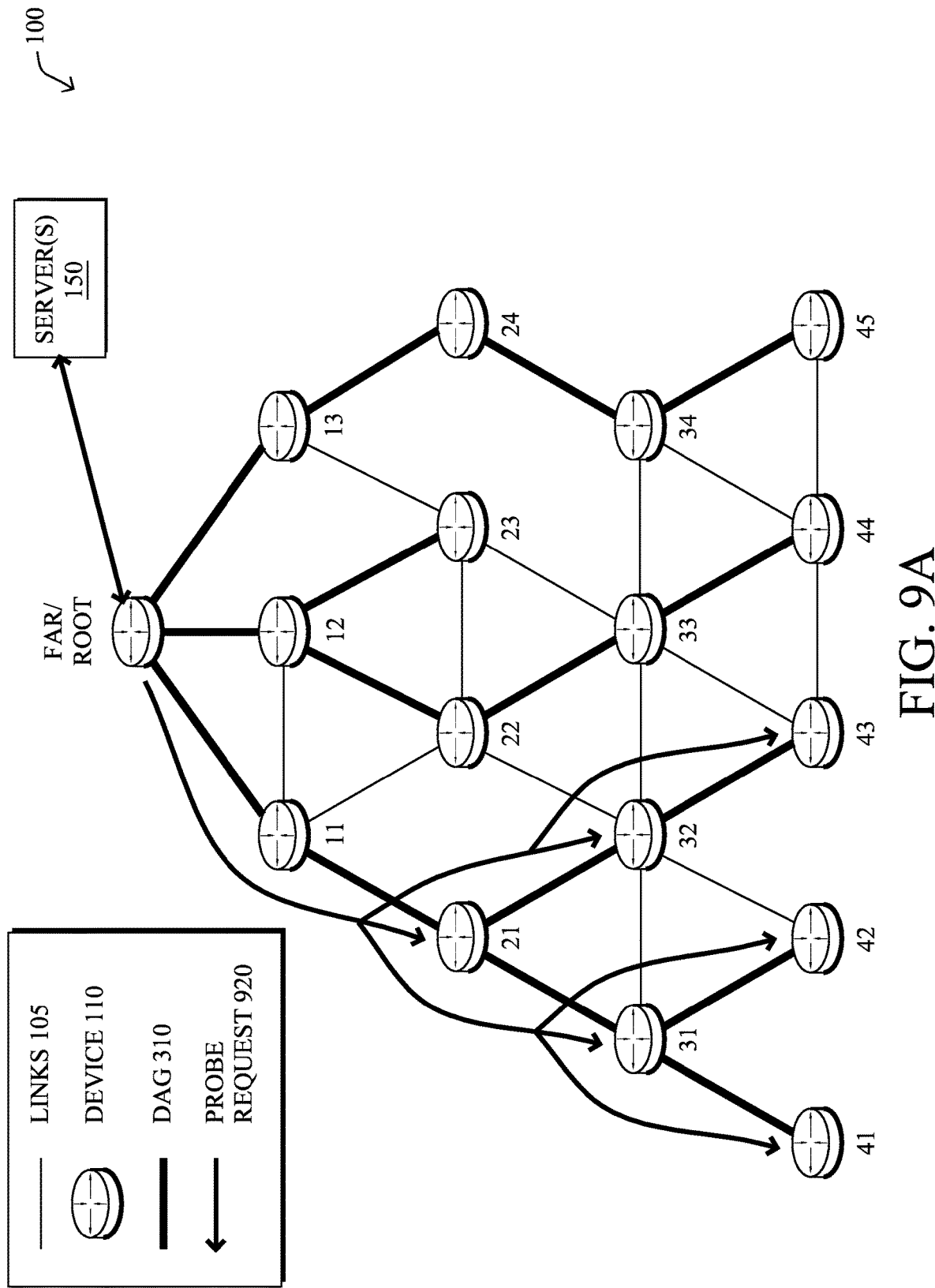
FIGS. 9A-9B illustrate an example of directed quality parameter probing.
Figure 9B:
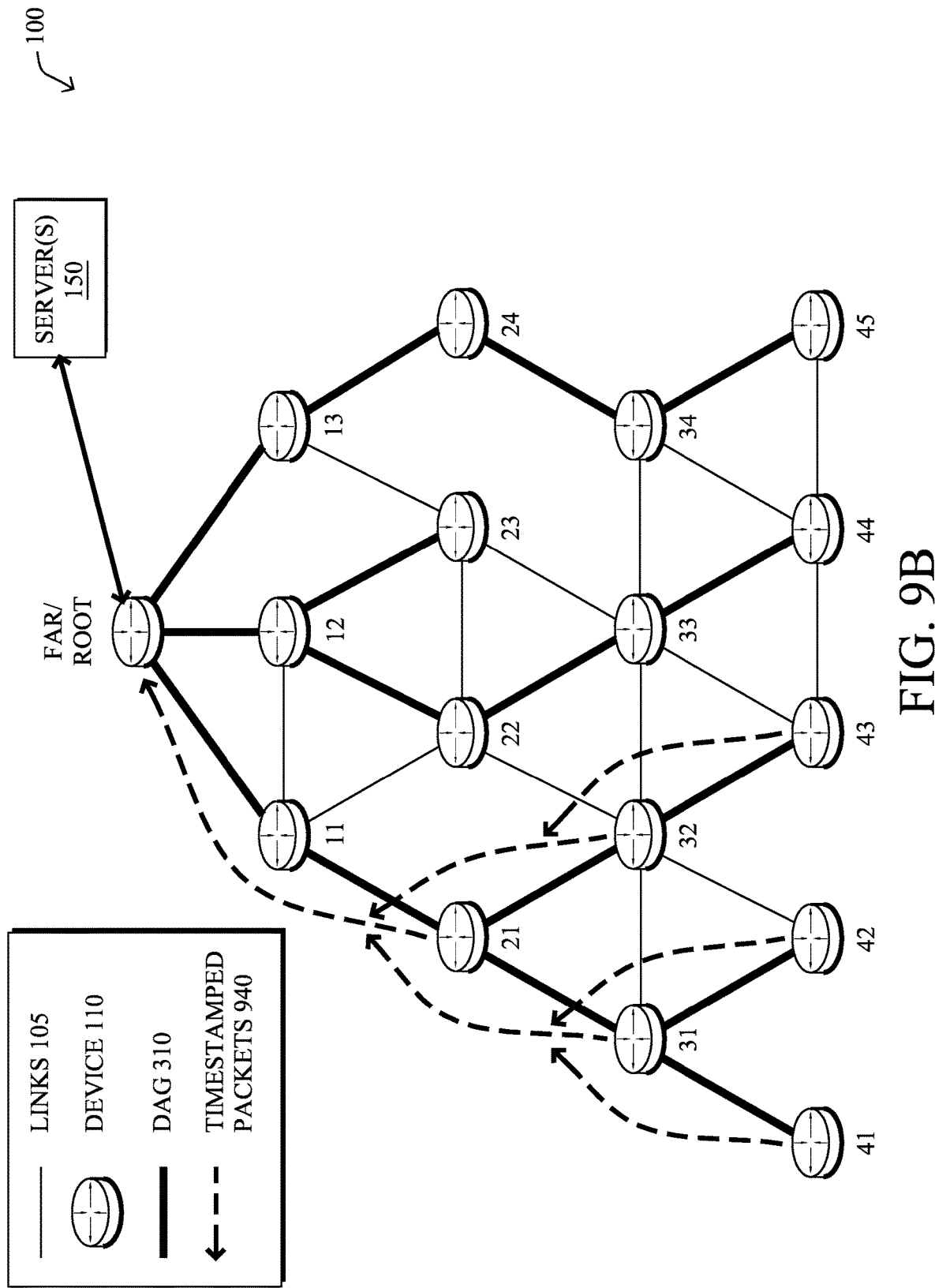

A fourth component of the techniques herein relates to probing of $Q_k$, which involves a non-negligible overhead, especially when using explicit probes should $Q_k$ represents the path delay or any other QoS parameters requiring to explicitly send probes in the network. U.S. Provisional Patent Application Ser. No. 61/761,106 proposes a technique for remote QoS monitoring. U.S. Provisional Patent Application Ser. No. 61/761,117, entitled "Learning Machine Based Detection of Abnormal Network Performance", filed by Vasseur et al. on Feb. 5, 2013, describes an architecture for online QoS monitoring and anomaly detection, similar to the one that is described above, but that uses a different input vector (node properties such as hop count, ETX, etc., rather than the traffic matrix T). This fourth component describes a method for determining what traffic should be time stamped. Bayesian methods such as VBLS yield an interval of confidence on the estimate they provide (in other words, they offer a measure of the reliability of this estimate). The techniques herein use this measure to decide whether the traffic must be time stamped. On one hand, if the interval of confidence on $Q_k$ is very small, this means that the algorithm is confident with the estimate of the QoS of $n_k$, and the traffic to this node should not be timestamped. On the other hand, if the interval of confidence is large, the algorithm should activate the probing mechanism, as more data regarding this particular node may be needed. In other words the fourth component of the techniques herein consists of using the output from VBLS to dynamically determine when additional information is needed on $Q_k$. FIGS. 9A-9B illustrate an example probe request 920 (e.g., to a subDAG/region and/or specific nodes) and associated quality parameter collection (e.g., timestamped packets 940) from those nodes, accordingly.

Figure 10:
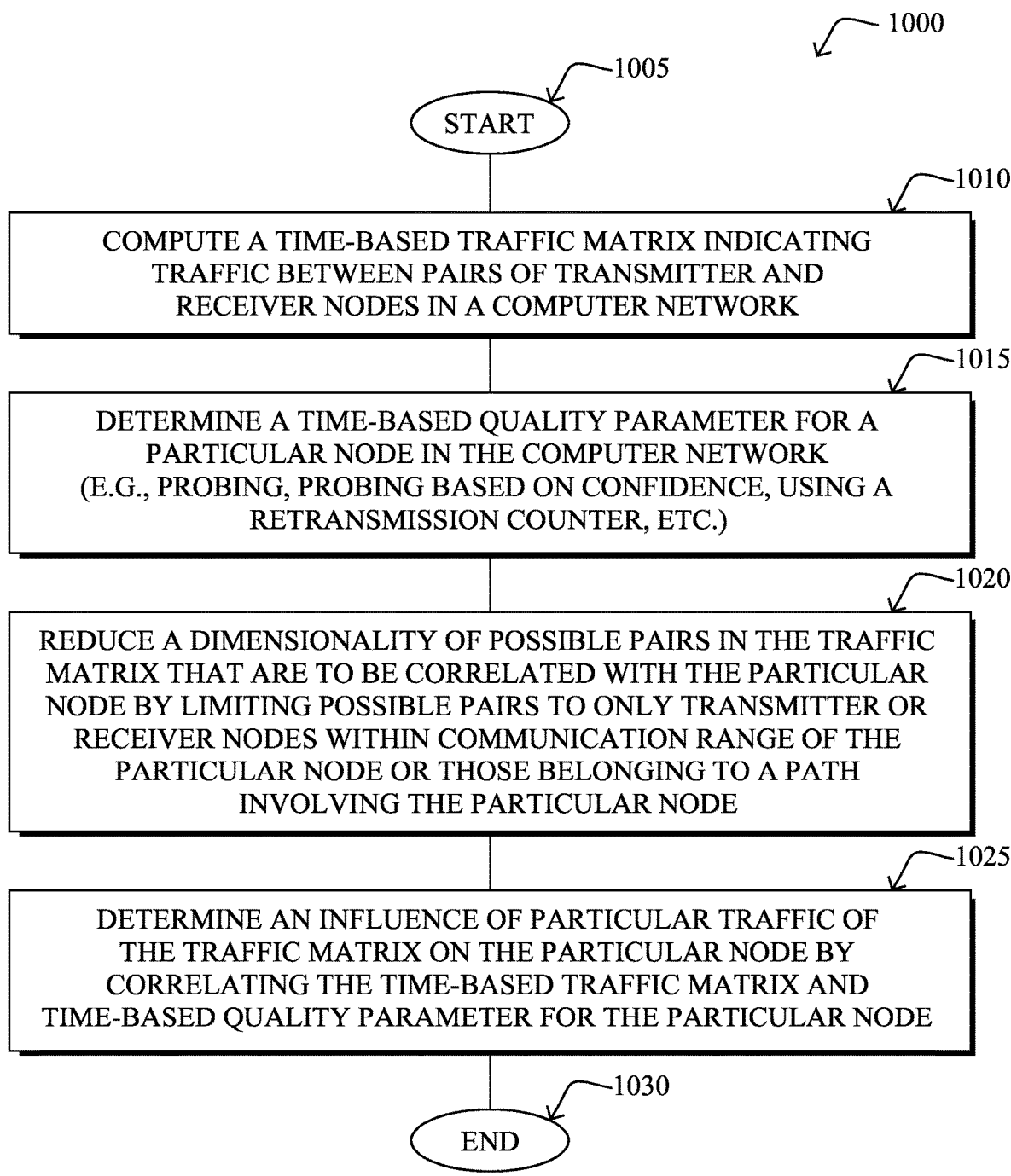
FIG. 10 illustrates an example simplified procedure for traffic-based inference of influence domains in a network by using learning machines.

FIG. 10 illustrates an example simplified procedure 1000 for traffic-based inference of influence domains in a network by using learning machines in accordance with one or more embodiments described herein. The procedure 1000 may start at step 1005, and continues to step 1010, where, as described in greater detail above, a management device (e.g., LM, FAR, Root, NMS, etc.) computes a time-based traffic matrix indicating traffic between pairs of transmitter and receiver nodes in a computer network. In addition, in step 1015, the device may also determine a time-based quality parameter for a particular node in the computer network (e.g., delay, number of retransmissions, number of retransmissions on a path involving the particular node, etc.), where the quality parameter may be either a scalar having a single quality metric or a vector having a plurality of quality-based information metrics. For example, the device may receive the quality parameter explicitly from a self-diagnosing node (e.g., determining its own measure of quality), or else may monitor traffic for indications within packets, such as timestamped packets, included retransmission counters in transmitted packets (e.g., incremented for each retransmission by nodes along the path), and so on. As mentioned above, the management device may probe for the quality parameter (e.g., instructing the particular node to timestamp transmitted packets), and may specifically determine when to probe for the quality parameter based on determining a confidence of the quality parameter.

In step 1020, the management device may optionally reduce a dimensionality of possible pairs in the traffic matrix that are to be correlated with the particular node by limiting possible pairs to only transmitter or receiver nodes within communication range of the particular node or those belonging to a path involving the particular node (i.e., only pairs having one node as either a transmitter or receiver node along the path). In step 1025, the device may then determine an influence of particular traffic of the traffic matrix on the particular node by correlating the time-based traffic matrix and time-based quality parameter for the particular node, in a manner as described in detail above (e.g., performing a linear regression between the traffic matrix and the quality parameter for a given time, such as VBLS). Note that the influence may be based on a particular transmitter nodes' influence (e.g., node 33, node 12) or else on transmitter and receiver node pairs (e.g., node 33-24, node 12-Root, etc.).

The procedure 1000 illustratively ends in step 1030, notably with the option to continue updating the traffic matrix and influence correlation over time. It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for traffic-based inference of influence domains in a network by using learning machines. In particular, the techniques herein provide the router and the NMS with information that is critical to the proper functioning of the network and that is simply not otherwise currently available. When combined with feedback mechanisms for performing traffic engineering, routing, and automatic troubleshooting, the techniques herein are advantageous in the context of the IoE and LLNs.

While there have been shown and described illustrative embodiments that provide for traffic-based inference of influence domains in a network by using learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   computing, by a learning machine, a time-based traffic matrix indicating traffic between pairs of transmitter and receiver nodes in a computer network;
   determining, by the learning machine, a time-based quality parameter for a particular node in the computer network;
   performing, by the learning machine, a linear regression between the traffic matrix and the quality parameter for a given time at the particular node;
   determining, by the learning machine, based on an output of the linear regression, an amount of influence particular traffic of the traffic matrix has on the particular node in the computer network by correlating the time-based traffic matrix and time-based quality parameter for the particular node, wherein datapoints of the time-based traffic matrix associated with the particular traffic are used as input variables to determine the amount of influence the particular traffic has on the particular node on a per node basis;

identifying, by the learning machine, one or more nodes in the computer network that affect performance of the particular node, wherein the performance includes a quality of service at the particular node based on the amount of influence; and setting, by the learning machine, the one or more nodes in the computer network that affect performance to inactive while the particular node is transmitting.

2. The method as in claim 1, wherein the linear regression uses a Variational Bayes Least Square (VBLS) regression algorithm.

3. The method as in claim 1, further comprising:
reducing a dimensionality of possible pairs in the traffic matrix that are to be correlated with the particular node by limiting possible pairs to only transmitter or receiver nodes within communication range of the particular node.

4. The method as in claim 1, further comprising:
reducing a dimensionality of possible pairs in the traffic matrix that are to be correlated with the particular node by limiting possible pairs to only those having a transmitter or receiver node belonging to a path involving the particular node.

5. The method as in claim 4, wherein the quality parameter is a number of retransmissions on the path involving the particular node.

6. The method as in claim 5, further comprising:
including a retransmission counter in a transmitted packet, wherein the retransmission counter is incremented for each retransmission by nodes along the path.

7. The method as in claim 1, further comprising:
probing for the quality parameter.

8. The method as in claim 7, further comprising:
determining when to probe for the quality parameter based on determining a confidence of the quality parameter.

9. The method as in claim 7, wherein probing comprises:
instructing the particular node to timestamp transmitted packets.

10. The method as in claim 1, wherein the influence is based on one of either a per transmitter node influence or a per transmitter and receiver node pair.

11. The method as in claim 1, wherein the quality parameter is one of either a scalar having a single quality metric or a vector having a plurality of quality-based information metrics.

12. The method as in claim 1, wherein the quality parameter is selected from a group consisting of: a delay; and a number of retransmissions.

13. An apparatus, comprising:
one or more network interfaces to communicate with a computer network;
a processor coupled to the network interfaces and adapted to execute one or more processes; and
a memory configured to store a process executable by the processor, the process when executed operable to:
compute, as a learning machine, a time-based traffic matrix indicating traffic between pairs of transmitter and receiver nodes in the computer network;
determine, as the learning machine, a time-based quality parameter for a particular node in the computer network;
perform a linear regression between the traffic matrix and the quality parameter for a given time;
determine, as the learning machine, based on an output of the linear regression, an amount of influence particular traffic of the traffic matrix has on the particular node in the computer network by correlating the time-based traffic matrix and time-based quality parameter for the particular node, wherein datapoints of the time-based traffic matrix associated with the particular traffic are used as input variables to determine the amount of influence the particular traffic has on the particular node on a per node basis,
identify, by the learning machine, one or more nodes in the computer network that affect performance of the particular node, wherein the performance includes a quality of service at the particular node based on the amount of influence; and
set, by the learning machine, the one or more nodes in the computer network that affect performance to inactive while the particular node is transmitting.

14. The apparatus as in claim 13, wherein the process when executed is further operable to:
reduce a dimensionality of possible pairs in the traffic matrix that are to be correlated with the particular node by limiting possible pairs to only transmitter or receiver nodes within communication range of the particular node.

15. The apparatus as in claim 13, wherein the process when executed is further operable to:
reduce a dimensionality of possible pairs in the traffic matrix that are to be correlated with the particular node by limiting possible pairs to only those having a transmitter or receiver node belonging to a path involving the particular node;
wherein the quality parameter is a number of retransmissions on the path involving the particular node.

16. The apparatus as in claim 13, wherein the process when executed is further operable to:
probe for the quality parameter.

17. The apparatus as in claim 16, wherein the process when executed to correlate is further operable to:
determine when to probe for the quality parameter based on determining a confidence of the quality parameter.

18. A tangible, non-transitory, computer-readable media having software encoded thereon, the software when executed by a processor operable to:
compute, as a learning machine, a time-based traffic matrix indicating traffic between pairs of transmitter and receiver nodes in a computer network;
determine, as the learning machine, a time-based quality parameter for a particular node in the computer network;
perform a linear regression between the traffic matrix and the quality parameter for a given time; and
determine, as the learning machine, based on an output of the linear regression, an amount of influence particular traffic of the traffic matrix has on the particular node in the computer network by correlating the time-based traffic matrix and time-based quality parameter for the particular node, wherein datapoints of the time-based traffic matrix associated with the particular traffic are used as input variables to determine the amount of influence the particular traffic has on the particular node on a per node basis, identify, by the learning machine, one or more nodes in the computer network that affect performance of the particular node, wherein the performance includes a quality of service at the particular node based on the amount of influence; and set, by the learning machine, the one or more nodes in the computer network that affect performance to inactive while the particular node is transmitting.

\* \* \* \* \*

UNITED STATES PATENT AND TRADEMARK OFFICE
CERTIFICATE OF CORRECTION

PATENT NO. : 10,540,605 B2
APPLICATION NO. : 13/946386
DATED : January 21, 2020
INVENTOR(S) : Gregory Mermoud et al.

Page 1 of 1

It is certified that error appears in the above-identified patent and that said Letters Patent is hereby corrected as shown below:

In the Specification

In Column 7, Line 48, please amend as shown:
uncertainty and/or the noise on the estimate $M_i$. The linear Signed and Sealed this
Fourth Day of August, 2020

Andrei Iancu
*Director of the United States Patent and Trademark Office*